(12) United States Patent
Sommer et al.

(10) Patent No.: US 6,641,210 B2
(45) Date of Patent: Nov. 4, 2003

(54) FRAME FOR A VEHICLE SLIDING SUNROOF

(75) Inventors: Volker Sommer, Schlangenbad/Barstadt (DE); Mathias Janda, Friedberg (DE); Steffen Seyfarth, Mainflingen (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/238,396

(22) Filed: Sep. 10, 2002

(65) Prior Publication Data

US 2003/0047970 A1 Mar. 13, 2003

(30) Foreign Application Priority Data

Sep. 11, 2001 (DE) .......................... 100 44 741

(51) Int. Cl.⁷ ................................... B60J 7/22
(52) U.S. Cl. ....................................... 296/217
(58) Field of Search ......................... 296/217

(56) References Cited

U.S. PATENT DOCUMENTS

| | | | | |
|---|---|---|---|---|
| 1,496,466 A | * | 6/1924 | Jackson ........................ | 16/260 |
| 3,853,371 A | * | 12/1974 | Bienert ....................... | 296/217 |
| 3,922,032 A | * | 11/1975 | Schaller ...................... | 296/217 |
| 4,781,410 A | * | 11/1988 | Gantner et al. ............. | 296/217 |
| 5,018,782 A | * | 5/1991 | Fiegel et al. ................ | 296/217 |
| 5,455,987 A | * | 10/1995 | Svehaug ...................... | 16/267 |
| 2002/0117876 A1 | * | 8/2002 | Sakai et al. ................. | 296/217 |

FOREIGN PATENT DOCUMENTS

| | | |
|---|---|---|
| DE | 39 06 903 A1 | 9/1990 |
| DE | 43 23 694 C1 | 8/1994 |
| DE | 195 14 586 A1 | 10/1996 |
| DE | 197 46 545 A1 | 5/1999 |
| EP | 1 063 144 A1 | 12/2000 |

OTHER PUBLICATIONS

European Search Report dated May 30, 2003.

\* cited by examiner

*Primary Examiner*—Dennis H. Pedder
(74) *Attorney, Agent, or Firm*—Carlson, Gaskey & Olds

(57) ABSTRACT

A frame is provided for vehicle sliding sunroofs, the frame front member of which is injection molded in one piece from a suitable plastic and has molded-on side arms for the connection of frame side members. Molded-on swivel bearings for supporting the deployment arms of a wind deflector, arranged on the frame front member, are incorporated into the frame front member and the side arms. The wind deflector can be specially fitted to the swivel bearings without the aid of separate fasteners, in that the swivel bearings and the associated swivel bearing pivot pins of the wind deflector are designed in the manner of so-called turn catches.

20 Claims, 2 Drawing Sheets

FRAME FOR A VEHICLE SLIDING SUNROOF

BACKGROUND OF THE INVENTION

The invention relates to a frame for a vehicle sliding sunroof.

The term "vehicle sliding sunroof" or "sliding sunroof" is here taken to mean all types that can be covered by this collective term, for which the attachment of a wind deflector in the area of the front edge of a vehicle roof opening, to which a moveable cover is assigned, is usual and/or appropriate, in particular for sliding sunroofs with only a slidable cover, for slide-and-tilt sunroofs with a cover that can also be deployed and for top-ridge sliding sunroofs (spoiler roofs) having a cover that can be partially displaced above the rear, fixed roof surface.

DESCRIPTION OF THE PRIOR ART

Wind deflectors generally have deployment arms directed rearwards, which at their rear ends are hinged on the frame, so that in opening movements of the cover the wind deflector, under spring force, is deployed from its rest position into its deployed position projecting upwards from the roof surface above the front edge of the roof opening. During closing movements of the cover, the latter runs directly or indirectly into the deployment arms and moves the wind deflector into its retracted rest position.

Although a wind deflector is also mentioned in the case of a known frame for a vehicle sliding sunroof (DE 197 46 545 A1), its design and method of support are neither described nor represented in the drawings. Wind deflectors, however, are commonly supported at bearing points that also have to be positioned on and attached to the frame. For this reason, the attachment location of the bearing points is subject to fluctuations occurring in manufacturing and assembly (production tolerances), so that malfunctions can occur in the operation of the sliding sunroof/wind deflector.

SUMMARY OF THE INVENTION

The object of the invention is to provide a frame of the generic type, which will permit easy, rapid and hence cost-effective attachment of a wind deflector to the frame with nevertheless accurate positioning.

According to the present invention, there is provided a frame for a vehicle sliding roof, the frame comprising a frame front member molded from plastic having two integrally molded-on side arms, to which frame side members running rearwards are connected, the members having water channels open at the top, of which one of said water channels is provided in the frame front member and accommodates a wind deflector in its undeployed rest position, wherein the wind deflector has wind deflector deployment arms, and wherein swivel bearings are provided, the swivel bearings being integrally formed on to the frame front member and are designed to receive swivel bearing pivot pins fitted to the wind deflector deployment arms.

According to the basic idea of the invention, the swivel bearing points for the wind deflector deployment arms are already incorporated into the front member and its side arms during the injection molding of the frame front member, the bearing points being formed not as parts that have to be additionally inserted into the injection mold, but formed from the plastic of the front member itself. When it comes to locating them on the frame front member, the bearing points are therefore not subject to any significant variations in manufacturing accuracy, but only to the very small injection molding die tolerances.

The swivel bearings may in each case be arranged in pairs in both side arms of the frame front member. At the same time all four swivel bearings may be situated on a common axis of alignment running at right angles to the vertical center plane of the frame. The two deployment arms of the wind deflector are therefore each supported at two bearing points, precise bearing symmetry being provided for both deployment arms.

The frame-side swivel bearings are advantageously designed as single receiving slots that are open at the top and suitably rectilinear, into which swivel bearing pivot pins, fitted from above to the ends of the wind deflector deployment arms, are introduced, which then find their bearing points at the lower ends of the receiving slots.

In order to avoid also having to secure the swivel bearing pivot pins in their bearing points against accidental escape from the receiving slots, that is having to hold them down, it is proposed, that the lower ends of the receiving slots should widen out into cylindrical bearing apertures, and that the swivel bearing pivot pins on the deployment arms, should not only have a diameter matched to the bearing apertures, but also flattened portions, which permit their introduction through the narrower receiving slots. When the swivel bearing pivot pins are then twisted into the cylindrical bearing apertures by swiveling the deployment arms, the swivel bearing points lock, so to speak, automatically.

If the aforementioned flattened portions are arranged approximately horizontally when the wind deflector is in the rest position, the wind deflector, with deployment arms directed approximately vertically downwards, can easily be introduced by the swivel bearing pivot pins into the receiving slots and brought into the bearing position. Even slight swiveling of the wind deflector towards its rest position then gives rise to locking of all four swivel bearings as described above.

If the distance between the end faces of the swivel bearing pivot pins is only slightly less that the distance between the associated slot base surfaces of the receiving slots, the wind deflector has only an advantageously small lateral play at its swivel bearing points.

In order not to have to provide thicker walls for the frame front member in the area of the wind deflector swivel bearings, into which walls the swivel bearings are to be molded, it is advantageous if the swivel bearings are molded into wall projections of the frame front member. In this case the thickened wall sections occur only in the area of the swivel bearings.

The wind deflector with its deployment arms and the swivel bearing pivot pins can also be integrally formed from plastic. The injection molding of the wind deflector in one piece also permits cost effective manufacturing to small production tolerances.

BRIEF DESCRIPTION OF THE DRAWINGS

Further details of the invention are explained in more detail below with reference to the drawings representing one example of embodiment, in which.

DESCRIPTION OF THE PREFERRED EMBODIMENTS

Figure 1:
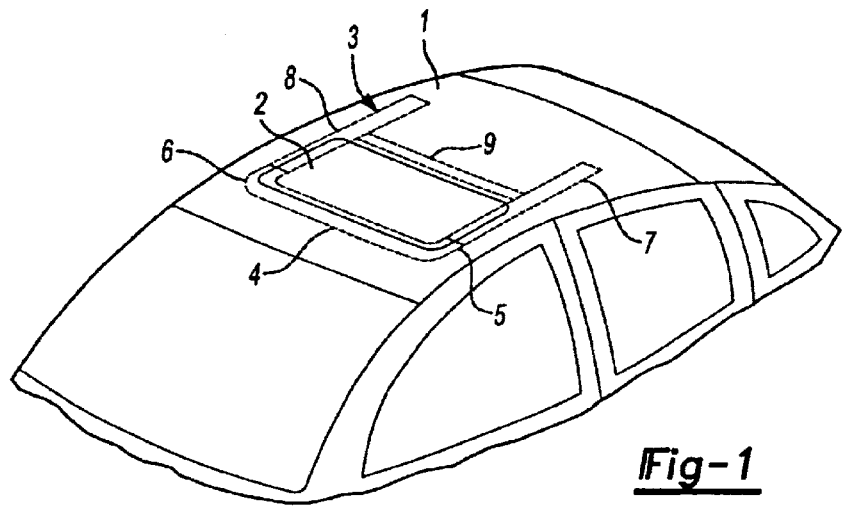
FIG. 1 shows a perspective view of a motor vehicle roof with sliding sunroof with the cover closed.

In FIG. 1 the frame 3 fitted under the fixed roof surface 1 and guiding the sliding cover 2 is drawn in only schematically. It is assembled from a frame front member 4, formed from plastic by injection molding and having integrally molded-on side arms 5 and 6, frame side members 7 and 8, running rearwards and connected to the arms 5 and 6, and a frame cross member 9, bracing and connecting the frame side members 7 and 8 together. As can clearly be seen from FIGS. 2 and 4 in particular, the frame side members 7 and 8 are in this example of embodiment manufactured by cutting continuously cast aluminum profile sections to length.

Figure 2:
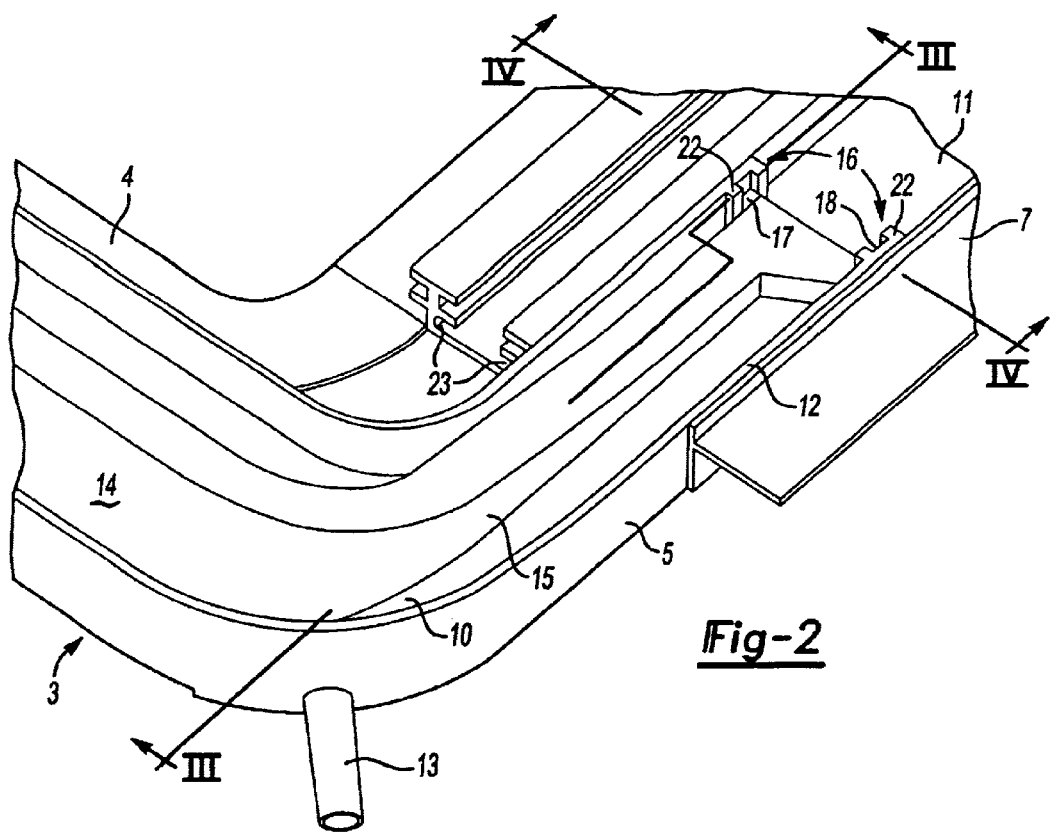
FIG. 2 shows a perspective view of the truncated frame looking towards the front left-hand frame corner, viewed in the direction of travel.

As will be seen from FIG. 2, the frame front member 4 has a water channel 10 open at the top, which also extends over the side arms 5, 6. Water channels 11, formed in the profiled frame side members 7, 8 and open at the top, are joined to the water channel 10. The side arms 5, 6 with U-shaped profile sections 12 form the water channel 10. The profile sections 12 are inserted with their rear ends into the water channels 11 of the frame side members 7, 8, forming a positive interlock. In the drawings, this situation is represented only with reference to left-hand side of the frame, viewed in the direction of travel. The water channels 10, 11 form a self-contained, watertight channel system, from which penetrating water is drained off via pipe connections 13 fitted at the front frame corners.

Figure 3:
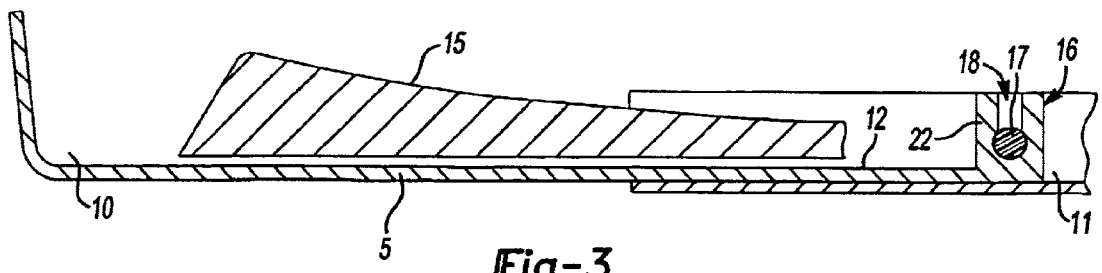
FIG. 3 shows the section along the line III—III in FIG. 2 with a wind deflector in its rest position.
Figure 4:
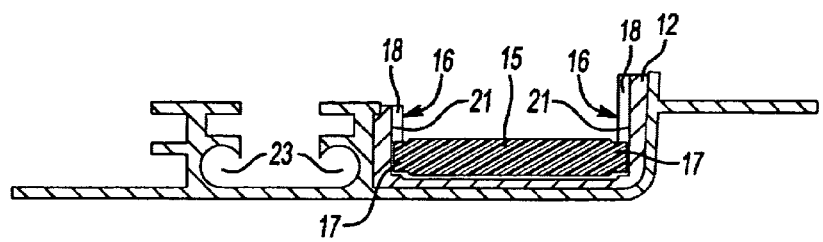
FIG. 4 shows the section along the line IV—IV in FIG. 2.
Figure 5:
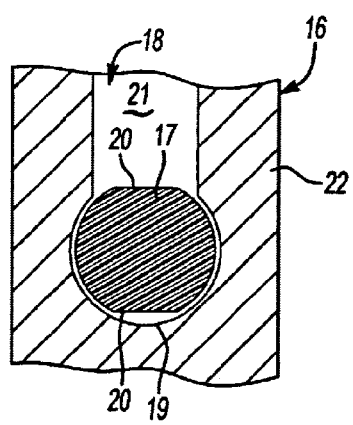
FIG. 5 shows an enlargement of the swivel bearing from FIG. 3.

As will be seen from FIGS. 2 to 4, the water channel 10 in the frame front member 4 accommodates a wind deflector 14 in its undeployed rest position, the wind deflector deployment arms 15, only the left-hand one of which, viewed in the direction of travel, is represented in the drawings of a laterally inverted arrangement, extending over the side arms 5, 6 and the profile sections 12 of the arms and terminating at the swivel bearings 16 arranged at their ends. The swivel bearings 16 are integrally molded on to the frame front member 4 and are designed to receive the swivel bearing pivot pins 17 fitted to the wind deflector deployment arms 15.

The swivel bearings 16 in the two side arms 5, 6 of the frame front member 4 are in each case arranged in pairs, so that a total of four swivel bearings 16 are provided on the frame, of which only the two left-hand ones can be seen from the drawings. All four swivel bearings 16 and the four associated swivel bearing pivot pins 17 are situated on a common (imaginary) axis of alignment, which runs at right-angles to the (imaginary) vertical center longitudinal plane of the frame 3.

The swivel bearings 16 are designed as receiving slots 18, open at the top and arranged approximately vertically in the profile sections 12 of the side arms 5, 6, for the swivel bearing pivot pins 17, fitted to the ends of the wind deflector deployment arms 15.

Figure 6:
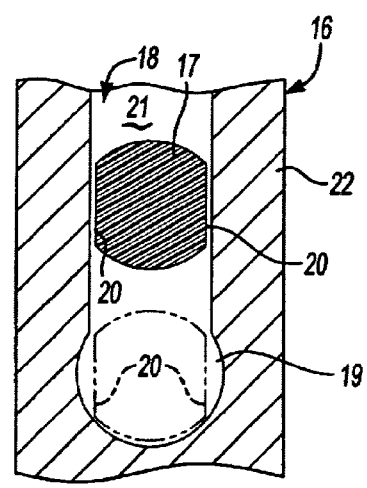
FIG. 6 shows the swivel bearing from FIG. 5, but with two intermediate positions of the swivel bearing pivot pin, which are temporarily assumed by the pivot pin when attaching the wind deflector.

The receiving slots 18 each widen at the bottom to a cylindrical bearing aperture 19, which forms the actual swivel bearing, the diameter of which is matched to the diameter of the swivel bearing pivot pins 17, that is to say it is only slightly larger than the pivot pin diameter, in order to permit rotation of the swivel bearing pivot pins with little radial play in the bearing apertures 19. The diameter of the bearing apertures 19 is, however, greater than the slot width of the receiving slots 18. In order to be able to nevertheless introduce the swivel bearing pivot pins 17 into the receiving slots 18, the swivel bearing pivot pins 17 in each case have two opposing plane-parallel flattened portions 20, the distance between which is somewhat less than the slot width of the receiving slots 18. These dimensional ratios are clearly shown in FIGS. 6 and 7. It is also possible to arrange just one flattening on the swivel bearing pivot pins 17 without otherwise affecting the functionality.

The position of the flattened portions 20 on the swivel bearing pivot pins 17 in relation to the rest position of the wind deflector 14 represented in the drawings is selected so that they are arranged approximately horizontally. In order to introduce the swivel bearing pivot pins 17 into the receiving slots 18 when fitting (or removing) the wind deflector 14, the latter is to be positioned so that its deployment arms 15 point approximately vertically downwards. Doing this, the flattened portions 20 assume approximately the position shown in FIG. 6. The swivel bearing pivot pins 17 can now be introduced into the receiving slots 18. Once the swivel bearing pivot pins 17 have fully entered the bearing apertures 19, corresponding to the position indicated by the dot-and-dash line in FIG. 6, the wind deflector can be swiveled forwards in the direction of travel, the swivel bearing pivot pins 17 rotating in the being apertures 19. Even small swivel angles of the deployment arms 15 cause the swivel bearing to lock, that is to say the swivel bearing pivot pins 17 can then not be brought upwards in the receiving slots 18.

As will be seen from FIG. 4, the distance between the end faces of the swivel bearing pivot pins 17 is somewhat smaller than the distance between the associated slot base surfaces 21 of the receiving slots 18. This results in only a slight axial play of the swivel bearings of the wind deflector 14. The swivel bearings, that is to say the receiving slots 18 and the bearing apertures 19 are formed in the wall projections 22 of the profile section 12 of the frame front member 4.

In the example shown, the wind deflector 14 is integrally formed with its deployment arms 15 and also with the swivel bearing pivot pins 17 from a suitable plastic.

It will be seen from the example of the frame side member 7 in FIGS. 2 and 4, but from FIG. 4 in particular, that in addition to the water channel 11 the frame side members also have a guide rail profiling for displaceable guiding of the cover 2 or of the slide elements (not shown) generally connected to the cover 2, and also two guide channels 23 for flexible drive cables (likewise not shown), which are guided in these channels affording compressive rigidity. The drive cables produce the various cover movements but, like the associated drive device, will not be explained further here, since the drive system for the cover is not part of the present invention. The design and attachment of the deployment springs for the wind deflector are not represented either.

In summary a frame is proposed for vehicle sliding sunroofs, the frame front member of which is injection molded in one piece from a suitable plastic and has molded-on side arms for the connection of frame side members. Molded-on swivel bearings for supporting the deployment arms of a wind deflector, arranged on the frame front member, are incorporated into the frame front member and the side arms. The wind deflector can be specially fitted to the swivel bearings without the aid of separate fasteners, in that the swivel bearings and the associated swivel bearing pivot pins of the wind deflector are designed in the manner of so-called turn catches.

We claim:

1. A frame assembly for a vehicle sliding roof, comprising:

a front frame member having a front channel portion and swivel bearings formed as part of the front frame member, such that the entire front frame member including the swivel bearings is a single plastic piece having a continuous, unbroken surface at an interface between the swivel bearings and an adjacent portion of the front frame member; and a wind deflector that is received in the front frame member channel in a first position, the wind deflector having swivel pivot member that are received by the swivel bearings such that the deflector is moveable into a second position where the deflector extends at least partially out of the channel.

2. The assembly of claim 1, wherein the front frame member includes side arms and wherein the swivel bearings are positioned in the side arms.

3. The assembly of claim 2, including a channel in each side arm and a swivel bearing on each side of each channel.

4. The assembly of claim 3, wherein a pivot axis defined by each swivel bearing is collinear with the pivot axis of every other swivel bearing.

5. The assembly of claim 1, including frame side members connected to opposite sides of the front frame member and extending toward a rear end of the frame.

6. The assembly of claim 1, wherein the wind deflector includes deployment arms and wherein the swivel bearing pivot members are supported near ends of the deployment arms.

7. The assembly of claim 6, wherein the swivel bearing pivot members comprise pins.

8. The assembly of claim 6, wherein the swivel bearing pivot members are integrally formed as part of the deflector deployment anus.

9. The assembly of claim 1, wherein the swivel bearings have a slot portion having a first width along a portion of their length and a wider portion near an end of the slots, the wider portion having a generally cylindrical contour.

10. The assembly of claim 9, wherein the pivot members are received in the slots and the pivot members have a first radial dimension across one plane and a second, larger radial dimension operative to maintain the pivot members in the widened portion of the slots during movement of the deflector relative to the frame.

11. The assembly of claim 9, wherein the pivot members comprise pins having two opposing generally planar portions and two opposing generally arcuate portions with a distance between the arcuate portions being greater than a width of the narrower portion of the slots.

12. The assembly of claim 11, wherein the flattened portions on the pins are arranged approximately horizontally when the wind deflector is received in the channel.

13. The assembly of claim 1, wherein the frame front member has wall projections with inward facing surfaces and the swivel bearings comprise channels in the wall projections surfaces.

14. The assembly of claim 6, wherein the wind deflector, deployment arms and the swivel bearing pivot members are all formed from a single piece of plastic.

15. A wind deflector assembly for a vehicle roof, comprising:

a front frame member having side arms that each have a channel between two sidewalls and swivel bearing grooves extending along an inner surface of each of the sidewalls, the entire front frame member being a single piece of plastic; and a wind deflector having swivel pivot members that are received by the swivel bearing grooves such that the deflector is moveable relative to the front frame member.

16. The assembly of claim 15, wherein the sidewalls have a nominal thickness along a substantial portion or the sidewalls and a second, greater thickness adjacent the swivel bearing grooves on each side of the grooves.

17. The assembly of claim 16, wherein the swivel bearing grooves are between projections that extend inward from the sidewalls.

18. The assembly of claim 15, wherein the swivel bearing grooves have a first width along a portion of their length and a wider portion near an end of the grooves, the wider portion having a generally cylindrical contour.

19. The assembly of claim 18, wherein the pivot members are received in the grooves and the pivot members have a first radial dimension across one plane and a second, larger radial dimension operative to maintain the pivot members in the widened portion of the slots during movement of the deflector relative to the frame.

20. The assembly of claim 19, wherein the pivot members comprise pins having two opposing generally planar portions and two opposing generally arcuate portions with a distance between the arcuate portions being greater than a width of the narrower portion of the slots.

* * * * *

UNITED STATES PATENT AND TRADEMARK OFFICE
CERTIFICATE OF CORRECTION

PATENT NO.    : 6,641,210 B2
DATED         : November 4, 2003
INVENTOR(S)   : Sommer et al.

It is certified that error appears in the above-identified patent and that said Letters Patent is hereby corrected as shown below:

<u>Column 5,</u>
Line 19, "member" should be -- members --
Line 42, "anus" should be -- arms --

Signed and Sealed this

Sixth Day of January, 2004

JAMES E. ROGAN
*Director of the United States Patent and Trademark Office*